United States Patent [19]

Eckert

[11] E Re. 30,734

[45] Reissued Sep. 8, 1981

[54] REVOLVING SELF-SERVICE DISPLAY STAND

[75] Inventor: Ronald P. Eckert, Northbrook, Ill.

[73] Assignee: DLM, Inc., Niles, Ill.

[21] Appl. No.: 955,275

[22] Filed: Oct. 26, 1978

Related U.S. Patent Documents

Reissue of:

[64] Patent No.: 4,102,069
Issued: Jul. 25, 1978
Appl. No.: 703,958
Filed: Jul. 9, 1976

[51] Int. Cl.[3] ..... G09F 11/02

[52] U.S. Cl. ..... 40/497; 40/531; 40/152.1; 40/535

[58] Field of Search ..... 40/16 R, 154, 606, 490, 40/537, 152, 152.1, 497

[56] References Cited

U.S. PATENT DOCUMENTS

| | | | |
|---|---|---|---|
| 822,354 | 6/1906 | Duncan | 40/152 |
| 1,566,316 | 12/1925 | Davis | 40/606 |
| 1,791,616 | 2/1931 | Duclos | 40/497 |
| 2,550,799 | 5/1951 | Fuller | 40/159 X |
| 2,581,762 | 1/1952 | Hesse | 40/497 |
| 2,659,992 | 11/1953 | Kiehl | 40/159 |
| 3,458,945 | 9/1969 | Edwards | 40/618 |
| 3,661,273 | 5/1972 | Crosslen | 40/497 |
| 3,969,838 | 7/1976 | Moore | 40/618 |

FOREIGN PATENT DOCUMENTS

| | | | |
|---|---|---|---|
| 1162510 | 9/1958 | France | 40/152 |

*Primary Examiner*—Gene Mancene
*Assistant Examiner*—Wenceslao J. Contreras
*Attorney, Agent, or Firm*—Wegner, Stellman, McCord, Wood & Dalton

[57] ABSTRACT

A revolving self-service sales display device is provided which comprises a vertically disposed revolving carrousel or pedestal carried on a base, which base can be set on a counter top, on the floor or on stands of any desired height. The revolving pedestal has a plurality of pivotally mounted, radially projecting frames for displaying flat members, such as posters, in pockets on each side of each frame. Each frame is provided with guide members both top and bottom for guiding the flat members into and out of the pockets in the frame. The frames have shaped pivots which extend into openings formed in sloping surfaces of a hub or bar such that the weight of the frame will always pivot the frame into a position with the body of the frame projecting radially outward from the pedestal. The device may have one, two or more pedestals stacked end-on-end in tandom or it may be a vertical rectangular support with horizontal frame engaging bars.

22 Claims, 18 Drawing Figures

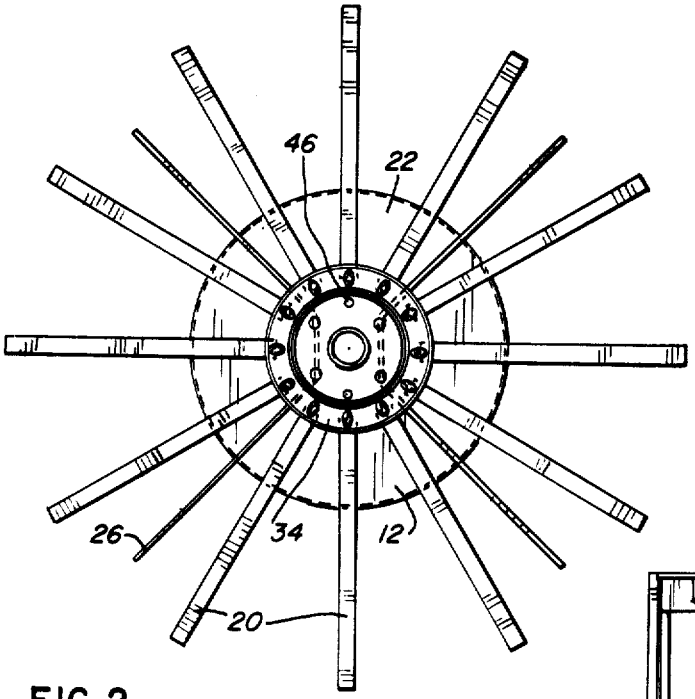
FIG. 2
FIG. 3
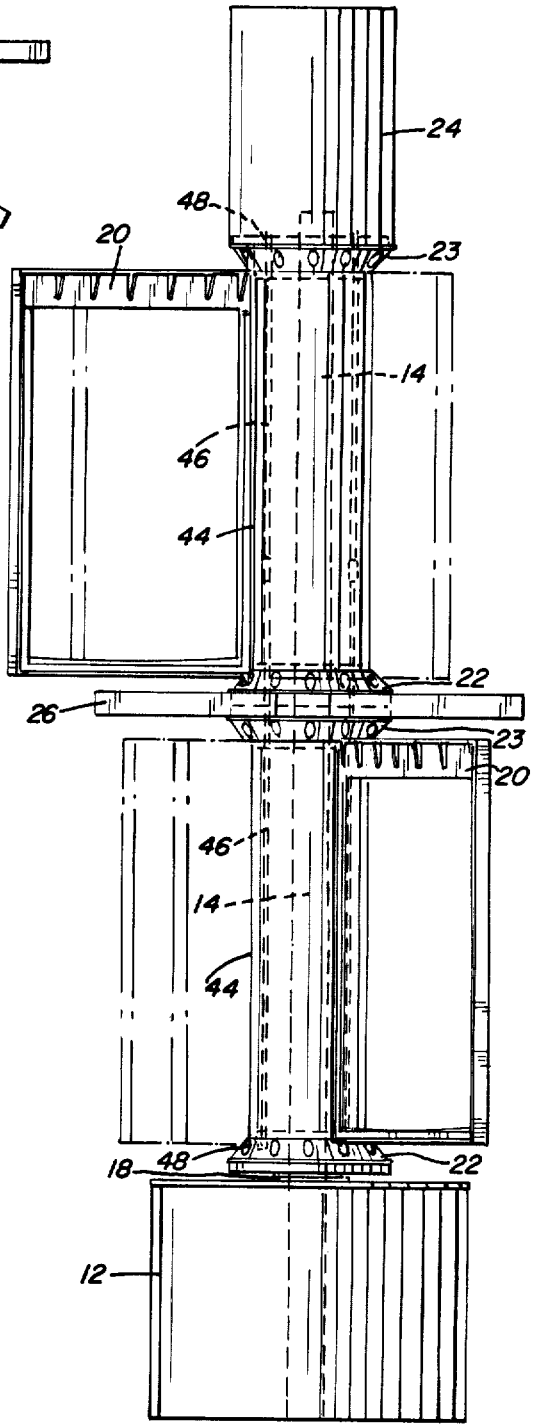
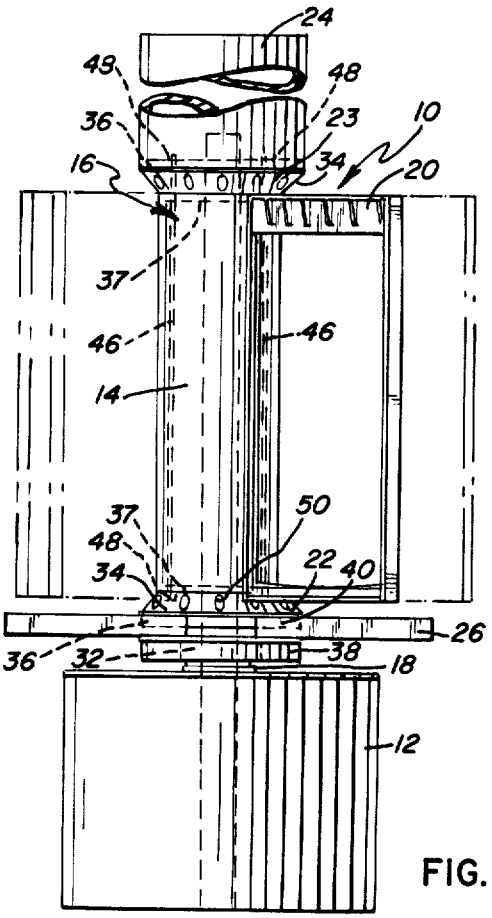
FIG. 1

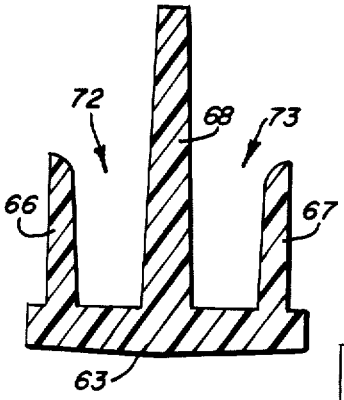
FIG. 5
FIG. 6
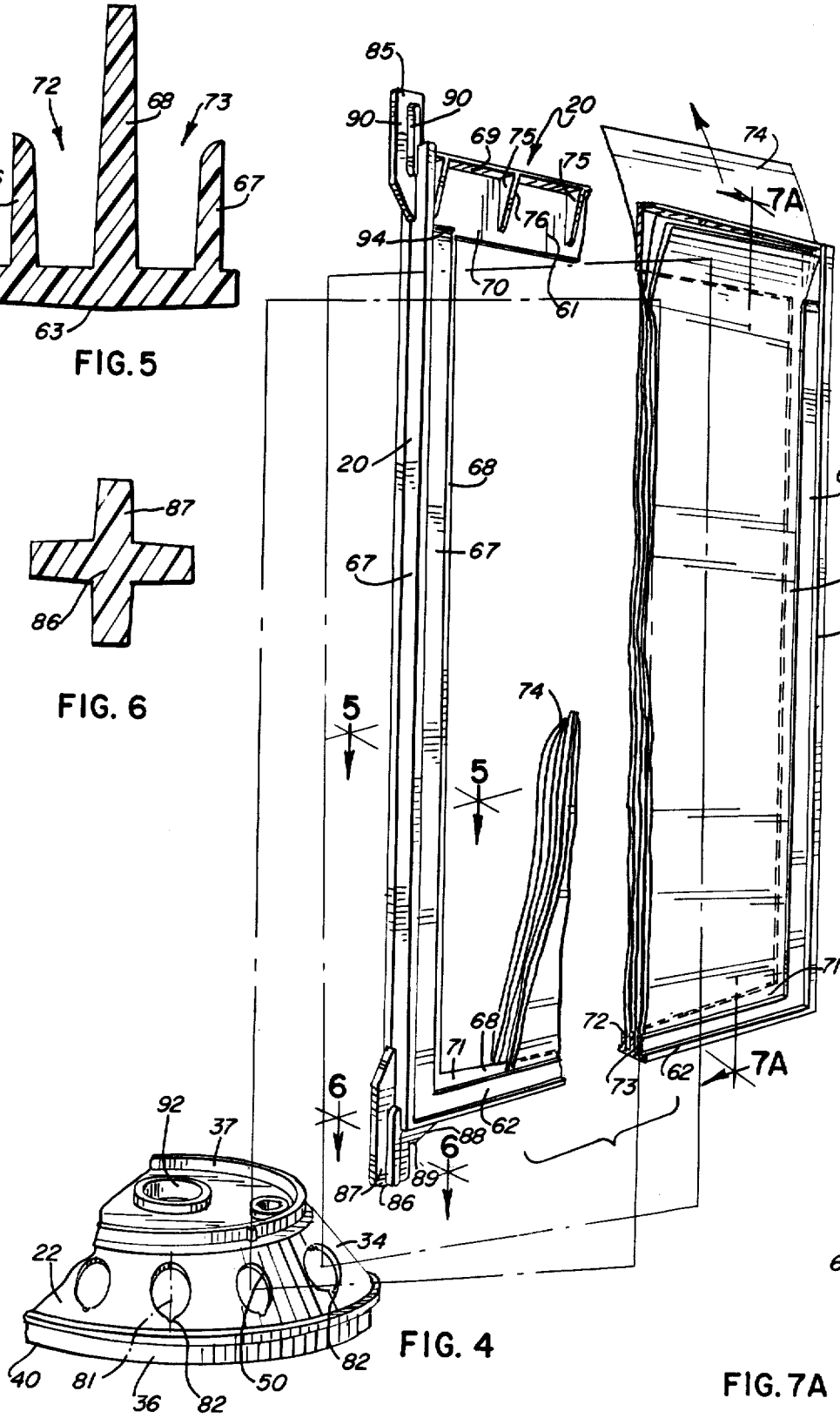
FIG. 4
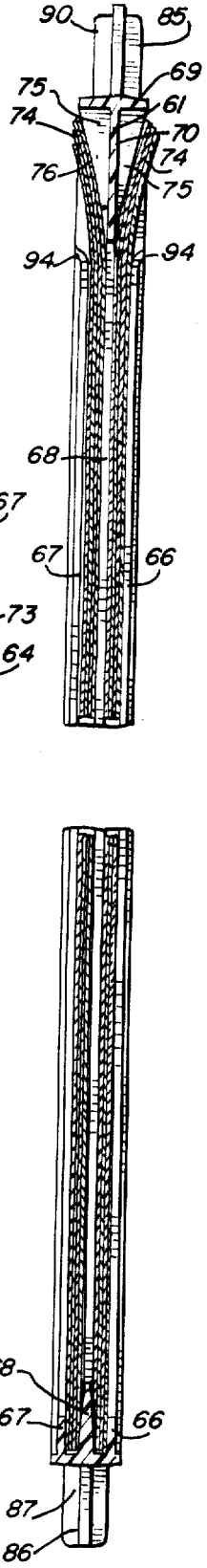
FIG. 7A

REVOLVING SELF-SERVICE DISPLAY STAND

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to sales display devices and, more particularly, to a novel frame and to a novel pivot mounting for the frame of a display device.

2. Description of the Prior Art

Devices for displaying flat sheet material, such as posters and the like, are in current use. Some of said devices have a vertical pedestal from which a plurality of frames project outwardly. Each frame is made up of metal strips forming a pocket in which flat material, such as posters, are stored so that the front poster is visible. The frames are pivotally mounted on pivots such that a viewer can pivot one frame after another as the front poster in each frame is viewed. After a viewer selects a poster, it is necessary to thread the poster up and out of the frame, which threading necessitates first a short vertical movement, then a bending forward of the top of the poster, and then further vertical movement, all of which can cause the poster to crease, crack, tear or become fingerprinted and soiled from all the manipulation needed to remove the poster from the frame.

The frames for displaying posters are metal while frames for displaying records or merchandise are sometimes made of plastic, but the plastic frame holds and displays only a single item in a frame, which frame is free to pivot on the stand without any self return to a preselected position.

SUMMARY OF THE INVENTION

An improved display device is provided whereby in one form, one or more revolving pedestals or carrousels can be stacked end-on-end in tandom on a base with each pedestal or carrousel having a plurality of radially projecting self-centering frames. In another form of display device, a vertically disposed rectangular-shaped stand is provided to support a plurality of transversely disposed frames. Each frame has a pair of oppositely facing pockets so as to display two posters at a time on each frame. Guide means are provided on the top and on the bottom of the frame for guiding the posters into and out of each pocket without bending, creasing, tearing or the like.

Each frame has a specially designed pivot which coacts with openings formed in tapered surfaces of the stand so that the weight of the frame will always return the frame to a central position whereby it extends radially outward from the center of the pedestal when used on pedestal-type stands.

The improved display device is aesthetic, is balanced and when the frames are released, they will assume a radially outward projecting position.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 is an elevational view of a revolving carrousel or pedestal self-service display device with the improved frame and frame pivoting arrangement;

FIG. 2 is a top plan view of the display device of FIG. 1;

FIG. 3 is a modified form of display device showing two revolving carrousels or pedestals in end-for-end tandom arrangement;

FIG. 4 is a partial exploded perspective view of the pivot mount for one frame of the display;

FIG. 5 is an enlarged cross-sectional view taken along the line 5—5 of FIG. 4;

FIG. 6 is an enlarged cross-sectional view taken along the line 6—6 of FIG. 4;

FIG. 7A is a cross-sectional view taken along the line 7A—7A of FIG. 4;

DESCRIPTION OF THE PREFERRED EMBODIMENT

Figure 7B:
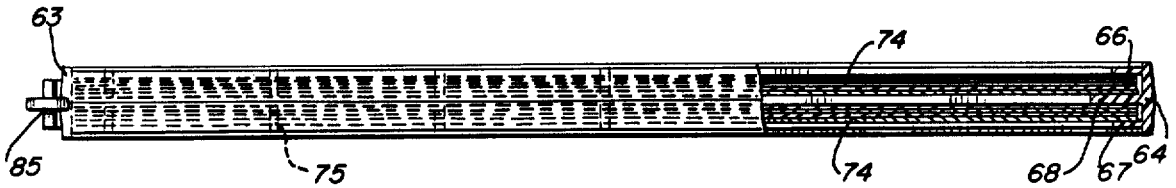
FIG. 7B is a plan view of a frame loaded with posters with part of the frame broken away and in section to illustrate the posters in the pockets of the frame.

Referring to FIGS. 1 and 2, a self-service revolving display device or stand 10 is illustrated and comprises a base 12 having a vertically extending shaft 14, a pedestal or carrousel 16 surrounding said shaft 14 and a lazy Susan-type revolving bearing 18 between the base 12 and the pedestal 16 whereby the pedestal or carrousel 16 is able to be revolved about the vertical axis of the shaft 14. A plurality of frame members 20 are pivotally mounted to spaced, conically-shaped hubs 22,23 of the pedestal 16. A cap 24 is carried by a portion of the hub 23 and is adapted to receive a display or advertising material thereon. Arms or handles 26 are secured in the lower hub 22, such that pressure on the arms 26 will revolve the pedestal or carrousel 16 about the vertical axis of the shaft 14.

Figure 14:
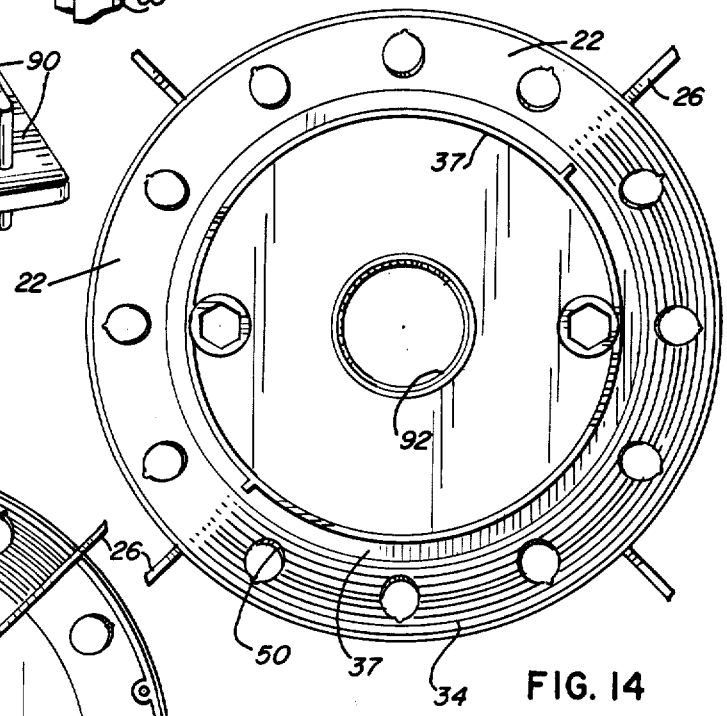
FIG. 14 is a top plan view of the conical mounting hub of the pedestal.
Figure 15:
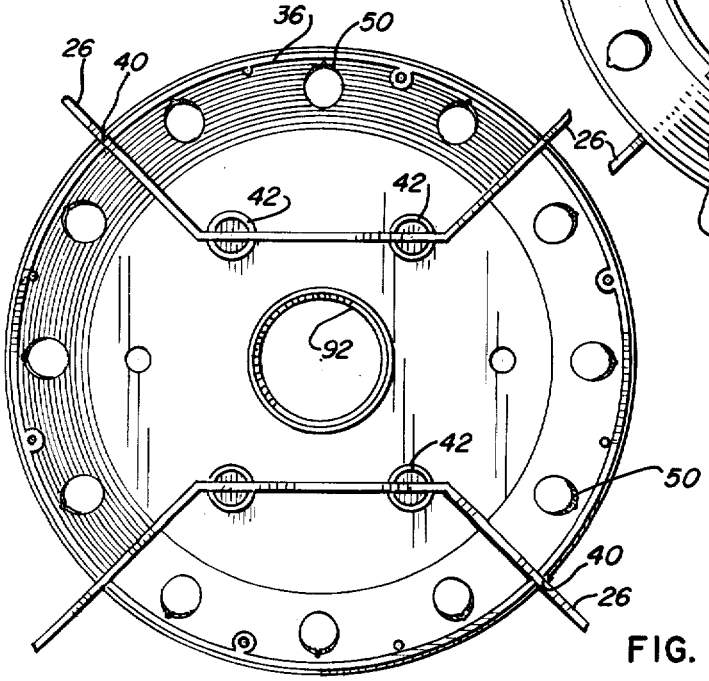
FIG. 15 is a bottom plan view of the conical mounting hub of FIG. 14.

Describing the display device or stand 10 more in detail, the lazy Susan-type revolving bearing 18 is secured to the top wall of the base 12 with the vertical shaft 14 extending from within the base 12 through the lazy Susan-type revolving bearing 18 and projects upwardly from the base 12. A bearing support 32 is secured to the shaft 14 and bears on the revolving part of the lazy Susan-type bearing 18. The pedestal or carrousel 16 is comprised of spaced facing hubs 22,23 which are identical in construction. As shown in FIGS. 4, 14 and 15, each hub has a conically-shaped portion 34 and oppositely extending cylindrically-shaped portions 36,37 integrally formed, respectively, with the large diameter and small diameter portions of the conically-shaped part 34. An open end of the cap 24 telescopes over the cylindrical portion 36 of the hub 23 and is fastened thereto for rotation with the hub. A cylindrically-shaped sleeve 38 engages with and encircles the bearing support 32 and mates with the cylindrical portion 36 of the hub 22 so that the bearing support 32, sleeve 38 and pedestal 16 all revolve about the shaft 14 on the lazy Susan revolving bearing 18 on the base 12. The arms 26, as can be seen in FIG. 2 and FIG. 15, project through slots 40 in the cylindrical portion 36 and sleeve 38 and are bent to pass through slotted lugs 42 on the hub 22. The material from which the arms 26 are made is relatively stiff so that they can have pressure applied to the outer end portion thereof as a means for rotating the pedestal or carrousel 16 relative to the base 12. A tubular member 44 encircles the shaft 14 and telescopes over the sleeve 37 on the lower hub 22. The upper hub 23, with the conical tapered portion 34 facing downward, is assembled with the tubular member 44 by inserting the sleeve 37 inside the end of said member 44. The hubs 22 and 23 are connected together by tie rods 46 passing through the hubs 22,23 and through the inside of the tubular member 44 and being secured by nuts 48 threaded on the ends of the tie rods 46.

A plurality of frames 20 are removably and pivotally seated in openings 50 formed in the facing conical portions 34 of the hubs 22,23 so that flat sheet material, such as posters, may be displayed by said frames 20.

The details of the one piece molded frames 20 and the connection between the frames 20 and the hubs 22,23 are best illustrated in FIGS. 4 through 12. Each frame 20 is comprised of a continuous outer frame member having a top 61, a bottom 62 and two sides 63,64. The bottom 62 and the two sides 63,64 are a C-shaped channel in cross section. The channel is divided midway between the two extending arms or flanges 66,67 of the C-shape by a partition or wall 68 which projects inwardly a distance somewhat greater than the length of said arms or flanges 66,67 of the channel. The top 61 of the frame 20 extends between the two sides 63,64 and is T-shaped in cross section with the head 69 of the "T" joining with the base of the C-shaped sides 63,64 and with the leg 70 of the "T" extending toward the enclosed center of the frame and being joined at each end with the partition 68 formed in the sides 63,64 and bottom 62 of the frame 20. In this way, the partition 68 of the channel and leg 70 of the top 61 divides the frame 20 into two halves with each half acting as a pocket 72,73 for receiving flat material, such as posters 74 or the like.

The partition 68 across the bottom 62 of the frame 20 has end portions 71 projecting farther into the open center of the frame near the sides 63,64 than at the midportion of said bottom 62. The inner edge of the bottom partition slopes gradually on a curve from the end portions 71 to the midportion. The higher end portions 71 of the partition 68 act as guides to funnel flat material, such as posters 74 and the like, into the pockets 72 or 73 in the frame.

For improving the ability to insert and remove posters from the pockets 72,73, a plurality of tapered guides or wedge-shaped members 75 extend between the head 69 of the "T" and the web or leg 70 of the "T" with the outer sloping edge 76 of the wedge-shaped member 75 aligning with and coinciding with the outwardly extending edge of the head 69 of the "T". In this way, flat sheets, such as posters 74, may be guided by the wedge-shaped guides 75 into each pocket 72 or 73 on the appropriate side of the frame 20. The posters 74, as shown in FIG. 7A, are stored in the pockets 72,73 with the top edge portion overlapping or overlying the sloping edges 76 of the guides 75. To remove a poster 74, it is only necessary to grasp the top of the poster and as it is moved upward, the wedge-shaped guides 75 will divert the poster outwardly beyond the overhang of the head 69 of the T-shaped top whereupon the poster 74 can be readily removed from the pocket without bending, creasing, folding or the like. To reload posters 74 in the pockets 72,73 of the frame 20, the bottom edge of the poster 74 is placed against the edges 76 of the guides 75 whereupon the poster is threaded into the appropriate pocket. The end portions 71 of the partition 68 on the bottom of the frame will guide the bottom edge of the poster into the appropriate pocket. With the frame 20 divided into two pockets 72,73, it is possible to display two posters in each frame with one being viewed from each side of the frame.

To pivotally mount the frames 20 on the hubs 22, 23 of the pedestal or carrousel 16, openings 50 are formed in the conical surfaces 34 of the top and bottom hubs 23,22 with the openings 50 appearing to be circular in shape when viewed from above along an axis through the center of the opening, which axis is parallel to the axis of the conical section of the hub. The openings 50 will be elliptical in shape when viewed transverse to the conical surface with the long or major axis 81 of the ellipse lying in a plane containing a radius of a circle centered on the axis of the conical section 34. A small dimple-like cutout 82 is formed in the lower end of the ellipse 80 and is centered on the major axis of the ellipse.

Figure 8:
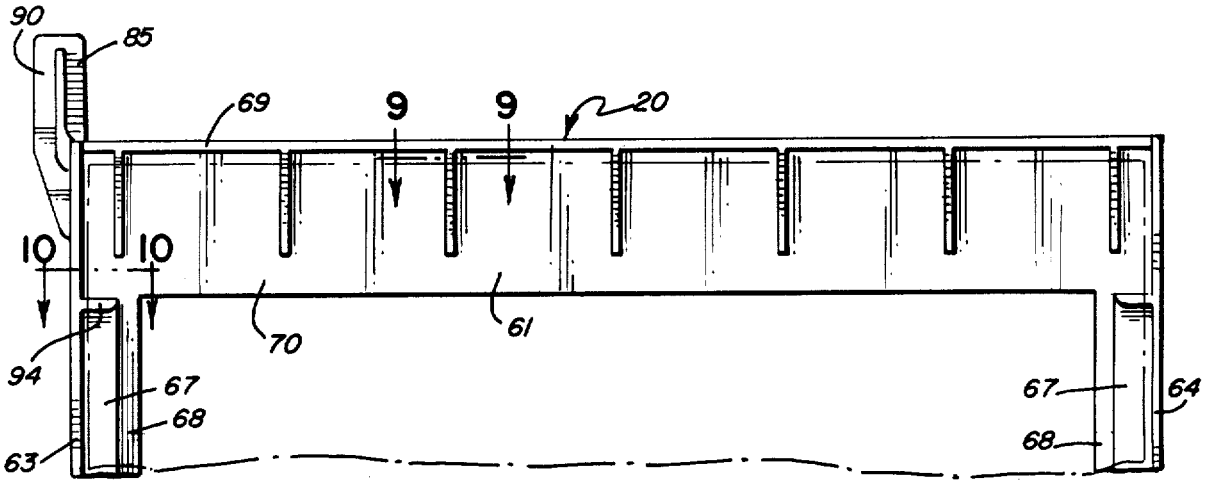
FIG. 8 is an elevational view of an improved frame.
Figure 8:
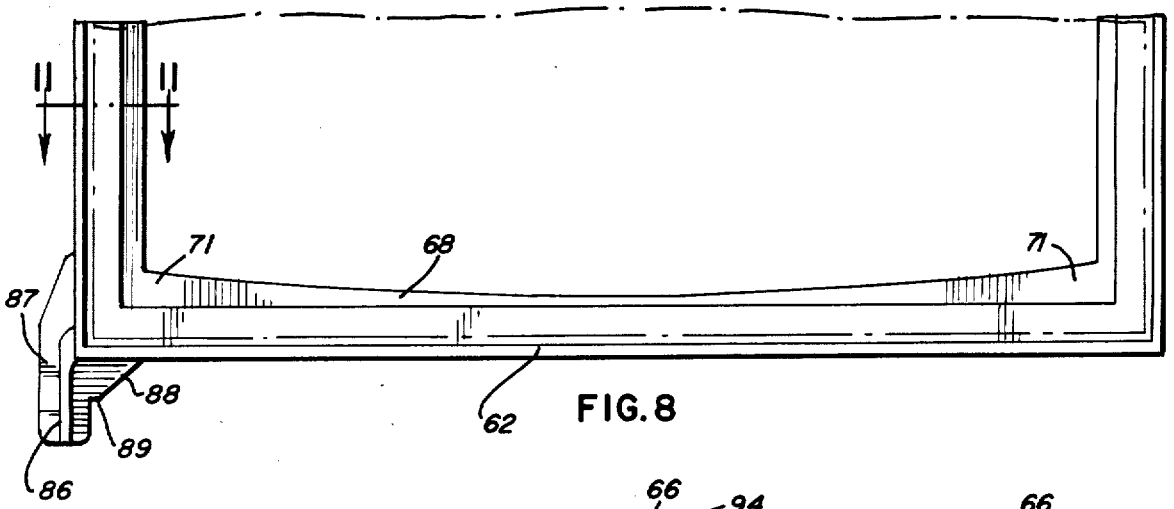
Figure 9:
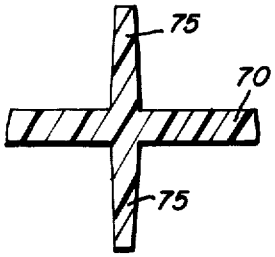
FIG. 9 is an enlarged cross-sectional view taken along the line 9—9 of FIG. 8.
Figure 10:
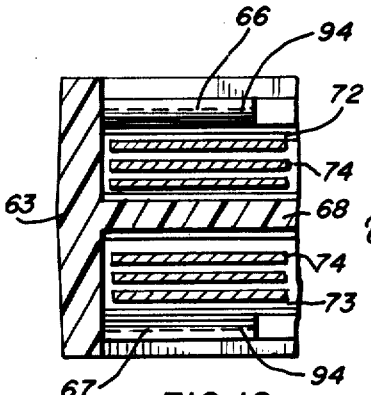
FIG. 10 is an enlarged cross-sectional view taken along the line 10—10 of FIG. 8.
Figure 11:
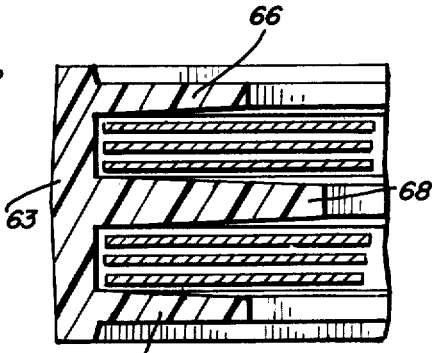
FIG. 11 is an enlarged cross-sectional view taken along the line 11—11 of FIG. 8.

Projecting upwardly and downwardly from the rear side wall 63 of the frame 20 are a pair of pivots 85,86 and, as can best be seen in FIGS. 4 and 6, the pivots have a cruciform cross section so that four equally spaced apart, radially equal length arms 87 project outwardly from the center portion thereof. As shown in FIG. 8, the lower pivot 86 has a sloping wall 88 merging with the one arm 87 with a slight shoulder intersecting with the sloping wall and with the vertical wall of the arm of the cruciform section to form the shoulder abutment 89 for the pivot 86. The upwardly extending pivot 85 contains four perpendicular radially equal length arms 90 with the one pair of arms 90 lying in the plane of the frame and extending a short distance above the ends of the other pair of arms 90.

With a frame 20 in hand, the upper pivot 85 is first threaded upwardly in one elliptical opening 50 in the tapered surface 34 of the top hub 23 and is moved upwardly until the top wall of the frame substantially engages with the tapered wall of the hub. The lower part of the frame with the lower pivot 86 is now moved so that pivot 86 aligns with a mating aligned elliptical opening 50 in the conical wall 34 of the lower hub 22 with the outer surfaces of the four cruciform arms 87 fitting in the opening 50. Upon releasing the frame, the weight of the frame will lower the frame relative to the hubs 22,23 of the pedestal until the shoulder abutment 89 on the one arm 87 of the cruciform section of the pivot engages with the dimple 82 in the bottom of the elliptical opening 50. The weight of the frame will hold the frame in the opening 50 in such a way that the shoulder abutment 89 stays seated in the dimple 82. Upon forcibly turning the frame 20 about the vertical axes of the pivots 85,86, the frame will raise as it is turned as the shoulder abutment 89 on the one cruciform arm 87 rides up the top surface of the edge of the elliptical opening 50. Upon releasing the frame, the weight of the frame will cause the shoulder abutment 89 to ride down the edge of the wall of the elliptical opening 50 until the shoulder abutment 89 drops into the dimple 82 at the low point of the opening 50. Due to the weight of the frame, the frame will be held in a radially extending position such that a plane passing through the vertical center of the frame will pass through the axes of the pivots 85,86 and through the axis of the pedestal 16.

From the above, it can be seen that flat material, such as posters 74, can be fed into the two pockets 72,73 formed on the opposite facing sides of the frame 20. All of the frames 20 will be loaded with oppositely facing pairs of posters until the whole carrousel arrangement has been loaded. With the display device on a counter or mounted on a floor in a sales area, a customer can push on the handle 26 to revolve the pedestal or carrousel 16 on the lazy Susan revolving bearing 18 about the vertical axis of the pedestal 16. Individual posters 74 in individual pockets 72,73 of each frame 20 can be viewed by pivoting the frame about the vertical axes of the pivots 85,86 of the frame. Upon selecting a poster 74, the customer can thread the poster out of the pocket of the frame by guiding the poster up the sloping edge 76 of the wedge-shaped guides 75 at the top of the pocket of the frame. Upon the customer releasing the frame, the frame will immediately reassume a radial position with respect to the axis of the pedestal. In this way, the display device will always have a symmetrical appearance to the viewing public with each frame being equally spaced from the adjacent frames and each side of each frame displaying a different poster. The handles 26 can be used to turn the pedestal or carrousel 16 relative to the base 12, or can be used to hold the carrousel 16 while an individual frame 20 is pivoted about its axis for closer scrutiny of the contents of the poster 74 in the frame 20.

Figure 13:
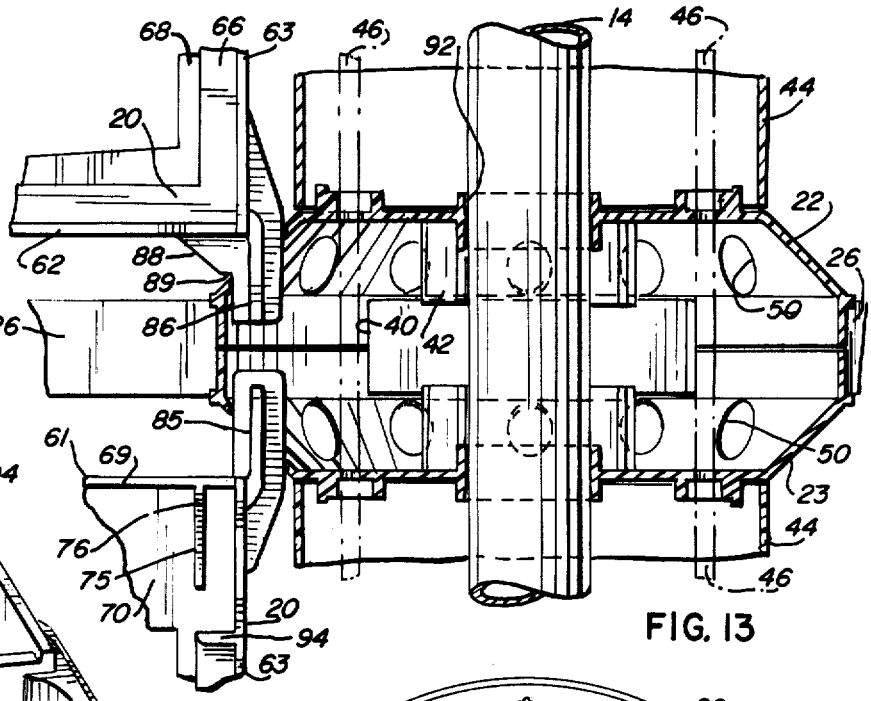
FIG. 13 is a partial elevational view of the connection to the hubs of the pedestals of the tandom mounted frames of FIG. 3.

The modified form of my invention shown in FIG. 3 shows a pair of carrousel or pedestal displays mounted in an end-to-end tandom arrangement, one upon the other. In this form of invention, the handles 26 are mounted between oppositely facing hubs 22,23, one of which forms the top hub 23 of the lower pedestal arrangement and the other hub 22 forms the bottom hub of the upper pedestal arrangement. In this form, the handle 26 extends between the slots 40 formed in the cylindrical portions 36 of the hubs 22,23 as the hubs are assembled back-to-back. The shaft 14 extends from the base 12 through the lazy Susan revolving bearing 18, through the bearing support 32, all the way up to and beyond the top hub 23 of the upper carrousel or pedestal. The cap 24 is telescoped over the cylindrical portion 36 of the upper hub 23 as previously described. As can best be seen in FIG. 13, the back-to-back hubs 22,23 receive and secure the handles 26 therein with the tie rods 46 passing from the bottom hub 22 through the pair of back-to-back hubs 22,23 and through the upper hub 23 and are bolted on each end to the topmost and bottommost hubs and, therefore, the individual pedestals are secured together for simultaneous rotation. The shaft 14 passes through the center openings 92 in the hubs 22,23 with just enough play to permit the two pairs of hubs 22,23 to revolve freely about the shaft 14. In the left-hand portion of FIG. 13, it can be observed how the upper cruciform pivot 85 of frame 20 of the lower carrousel seats in the elliptical opening 50 in the conical portion 34 of the hub 23. It also shows how the downwardly depending cruciform pivot 86 of the upper frame nests in the elliptical opening 50 in the conical portion 34 of the lower hub 22 with the shoulder abutment 89 nested in the dimple 82 on the major axis of the elliptical opening 50. Since both upper and lower frames having the dimpled elliptical openings 50 receiving the lower cruciform pivots 86, the frames 20 will be vertically aligned with each other in a common plane which passes through the axis of the shaft 14. One frame 20 can be turned relative to the other frames no matter whether they are vertically aligned or vertically offset from each other. Once any one of the frames is released, it will always reassume its radial position by the shoulder abutment 89 riding down and nesting in the dimple 82 of the elliptical opening 50.

Figure 12:
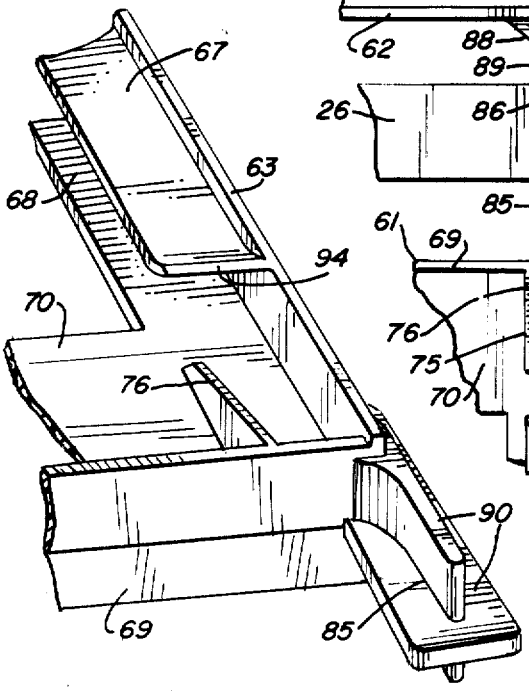
FIG. 12 is a partial perspective view of one corner of an improved frame.

FIG. 12 is a perspective view of the side wall 63 of the frame 20 with the cruciform upper pivot 85 projecting toward the viewer. One angled wedge-shaped guide 75 is illustrated showing the edge 76 of the inclined wall merging with the outer edge of the top of the "T". The upper edge 94 of the inwardly facing arm 67 of the channel-shaped side walls is curved slightly outwardly to assist in threading posters 74 into and out of the pocket on the side of the frame.

Figure 17:
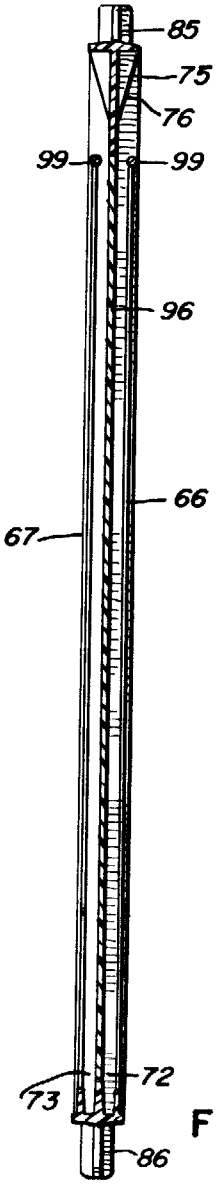
FIG. 17 is a cross-sectional view taken along the line 17—17 of FIG. 16.
Figure 16:
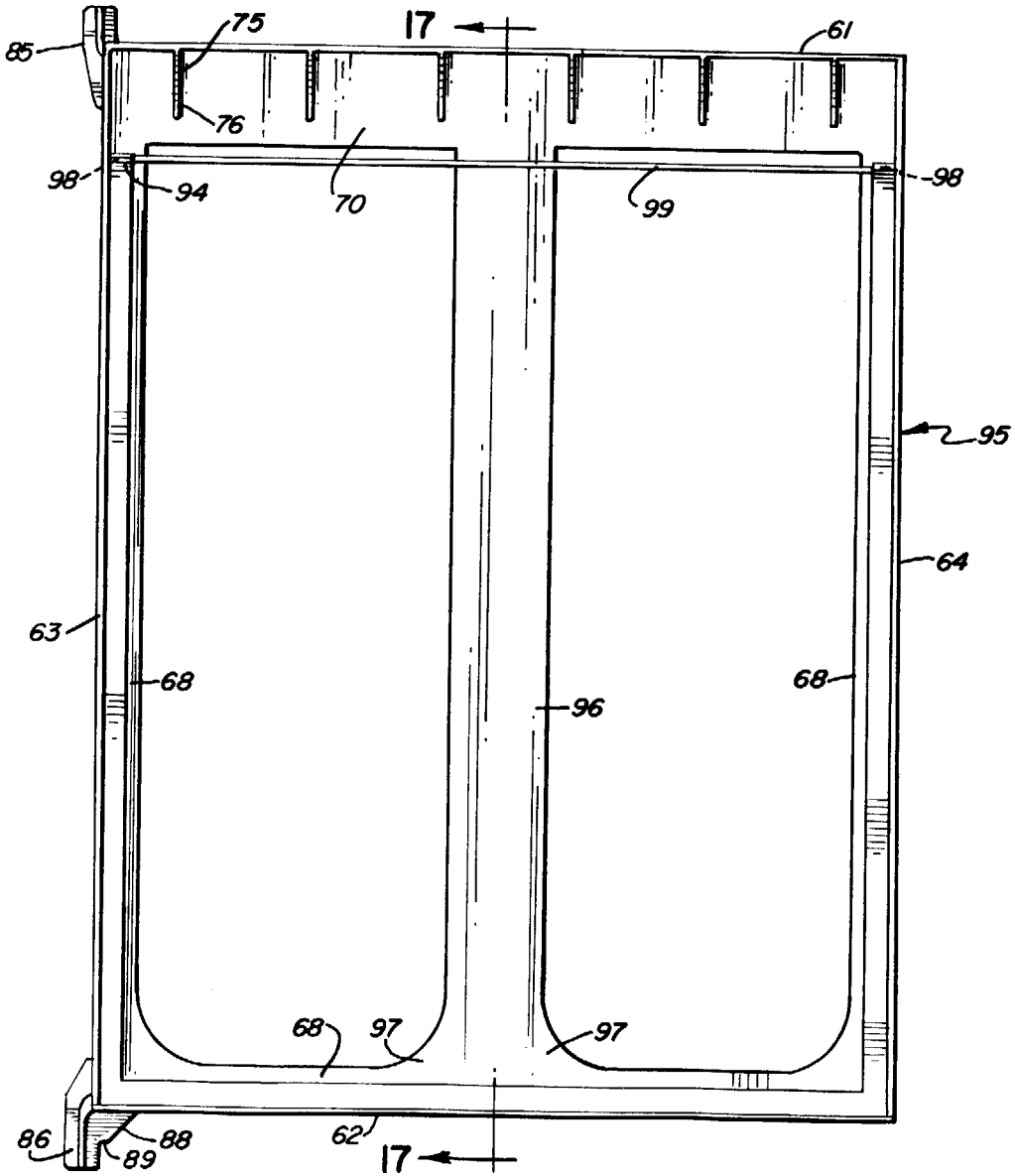
FIG. 16 is an elevational view of a modified form of frame for use primarily with larger posters.

As shown in FIGS. 16 and 17, a larger frame 95 has a reinforcing web 96 extending from the leg 70 of the T-shaped top 61 of the frame to the partition 68 on the bottom 62 of said frame. The web 96 merges into the partition 68 at the bottom so as to form tapered guides 97 for guiding flat sheets, such as posters 74, into the pockets 72 or 73 on opposite sides of the frame. Mating openings 98 are molded in the sides 63,64 of the frame at about the level of the merging top edges 94 of the arms or flanges 66,67. A rod 99 extends between each pair of aligned openings 98 and spans the distance between the sides 63,64. There is a rod 99 on each side of the frame which rod is spaced outwardly from the web 96 and from the plane containing the web 96, leg 70 and partition 68 such that posters 74 can be threaded between the rod 99 on one side or the other, and the partition 68, leg 70 and web 96 and into the appropriate pocket 72 or 73. The rods 99 serve both as stiffeners for the frame and as supports for holding the posters in the pockets. The remainder of the frame 95 is the same as frame 20 described hereinabove and is made of a molded plastic material.

Frames, such as frame 95, can be used in carrousel mountings or in vertical rectangular stands where the pivots 85,86 are rotatably received in openings in horizontal bars forming the upper and the lower parts of the stand. The frames 95 can be pivoted about the pivots 85,86 so as to make it possible to view either side of the frame.

I claim:

1. A revolving self-service poster display stand having a base, an upstanding pedestal mounted on said base for revolving about a vertical axis, a plurality of frames radially projecting from said pedestal, each frame having one side wall with upper and lower pivot members carried thereby, said upper and lower pivot members being cruciform in cross section and extending into elliptical openings formed in spaced conically sloping surfaces of said pedestal, and means on said lower pivot member for engaging with means on the edge of one of said elliptical openings for positioning said frame in a radially oriented position under the influence of the weight of said frame.

2. In a revolving self-service poster display stand as claimed in claim 1 wherein said pedestal is mounted on a lazy Susan bearing carried by said base whereby said pedestal may be revolved about a vertical axis.

3. In a revolving self-service poster display stand as claimed in claim 1 wherein said pedestal includes a pair of spaced apart hubs with said conical surfaces being a portion of said hubs.

4. In a revolving self-service poster display stand as claimed in claim 3 wherein said hubs are spaced apart by a tubular member, rod means passing through said hubs and said tubular member for securing said hubs together to form said pedestal.

5. In a revolving self-service poster display stand as claimed in claim 3 wherein each hub has a pair of oppositely extending cylindrical sleeves integrally formed with said conical surface portion.

6. In a revolving self-service poster display stand as claimed in claim 3 wherein said means on said lower pivot is a shoulder abutment, and said means on the edge of said elliptical openings is a dimple at the low point of said elliptical opening whereby said shoulder abutment is urged into said dimple by the weight of said frame whereby the frame projects radially outward from the vertical axis of said stand.

7. In a revolving self-service poster display stand as claimed in claim 3 wherein a handle is nested in one of said hubs and projects radially outward from said hub whereby pressure on said handle will rotate said pedestal.

8. A revolving self-service poster display stand having a base, an upstanding pedestal mounted on said base for revolving about a vertical axis, a plurality of frames radially projecting from said pedestal, each of said frames holding a plurality of display panels, each frame having a top, a bottom and two side walls, pivot members projecting from one of said side walls, said pivot members having a cruciform cross section and project into elliptically-shaped openings formed in conically tapered walls of said pedestal to permit said frames to be rotated about the axes of said pivots, each frame being divided into two pockets, and guide means formed on the top of the frame and extending into the pockets for guiding posters into and out of appropriate pockets in said frame.

9. A revolving self-service poster display stand having a base, an upstanding pedestal mounted on said base for revolving about a vertical axis, a plurality of frames radially projecting from said pedestal, each of said frames holding a plurality of display panels, each frame having a top, a bottom and two side walls with one side wall having upwardly and downwardly projecting pivot members carried thereby, said pivot members being operatively connected to said pedestal to permit said frames to be rotated about the axes of said pivots, each frame having the bottom and the two sides comprised of a molded plastic inwardly open channel member having a C-shape in cross section, a divider molded integrally with the back of the C-shaped channel and projecting inwardly from a point midway between the two legs of the C-shaped channel, the top of the frame having a T-shape in cross section with the leg of the "T" projecting inwardly toward the center of the frame and joining the divider carried by the sides of the frame whereby the frame is divided into two halves, and guide means extending between the top of the "T" and the leg of the "T" to guide posters into and out of the channel on each side of the divider.

10. A frame for displaying material on opposite sides thereof, said frame having a top, a bottom and two side walls with one side wall having upwardly and downwardly projecting pivot members carried thereby, said pivot members being operatively connected to a stand to permit said frame to be rotated about the axes of said pivots, said frame having the bottom and the two sides comprised of a molded plastic inwardly open channel member having a C-shape in cross section, a divider molded integrally with the back of the C-shaped channel and projecting inwardly from midway between the two legs of the C-shaped channel, the top of the frame having a T-shape in cross section with the leg of the "T" projecting inwardly toward the center of the frame and joining the divided carried by the sides of the frame whereby the frame is divided into two halves, and guide means extending between the top of the "T" and the leg of the "T" to guide posters into and out of the channel on each side of the divider.

11. In the frame as claimed in claim 10 wherein second guide means are formed as part of said partition along the bottom of said frame for guiding the posters into the appropriate pocket on the appropriate side of the frame.

12. In the frame as claimed in claim 10 wherein a web extends between said top and bottom of said frame and wherein rod means extends from one side wall of the frame to the other side wall in spaced relation to the partition and to the web to define the opening into the appropriate pocket and to support the top center portion of posters seated in said pocket.

13. In the frame as claimed in claim 10 wherein said pivot members have a cruciform in cross section and said downwardly projecting pivot member has a shoulder abutment formed on an inwardly projecting leg of the cruciform of the pivot member.

14. A frame for holding a plurality of display panels comprising a molded plastic outer frame having an inwardly opening channel on a bottom and on two sides thereof, the top of the frame having a T-shape in cross section with the leg of the "T" projecting inwardly toward the center of the frame, a divider molded integrally with the frame midway between the sides of the channel, said divider joining the leg of the "T" whereby the frame is divided into two halves, and guide means extending between the top of the "T" and the leg of the "T" to guide flat members into and out of the channel on each side of the divider.

15. A frame for holding a plurality of display panels comprising a molded plastic channel forming a bottom and two sides thereof, a divider molded integrally with the frame midway between the sides of the channel to divide the frame into two pockets, a top for the frame joining the two sides together, guide means carried by said top and extending into each said pocket to guide display panels into and out of the pocket on each side of the divider, said guide means comprises a plurality of triangle-shaped webs having the hypotenuse of the triangle lying flush with the outer edge of the top so that panels being removed from the pockets will be guided out of the pocket without interference from said top.

16. In the frame as claimed in claim 10 wherein said guide means comprise a plurality of triangle-shaped webs extending between the top of the "T" and the leg of the "T" with the hypotenuse of the triangle lying flush with the outer edge of the top of the "T".

17. A frame for holding a plurality of display panels comprising a molded plastic outer frame having an inwardly opening channel on three sides thereof, the fourth side of the frame having a T-shape in cross section with the leg of the "T" projecting inwardly toward the center of the frame, a divider molded integrally with the frame midway between the sides of the channel, said divider joining with said leg of the "T" whereby the frame is divided into two halves, and guide means extending between the top of the "T" and the leg of the "T" to guide flat members into and out of the channel on each side of the divider.

18. A frame for displaying material on opposite sides thereof, said frame having four walls with one wall having upwardly and downwardly projecting pivot members carried thereby, said pivot members being operatively connected to a stand to permit said frame to be rotated about the axes of said pivots, said frame having three of said walls comprised of a molded plastic inwardly open channel member having a C-shape in cross section, a divider molded integrally with the back of the C-shaped channel and projecting inwardly from midway between the two legs of the C-shaped channel, the fourth wall of the frame having a T-shape in cross section with the leg of the "T" projecting inwardly toward the center of the frame and joining said divider whereby the frame is divided into two halves, and guide means extending between the top of the "T" and the leg of the "T" to guide posters into and out of the channel on each side of the divider.

*19. A frame for displaying material on opposite sides thereof, said frame having a top, a bottom and two side walls with one side wall having upwardly and downwardly projecting pivot members carried thereby, said pivot members being operatively connected to a stand to permit said frame to be rotated about the axes of said pivots, said frame having the bottom and the two sides comprised of a molded plastic inwardly open channel member having a C-shape in cross section, a divider molded integrally with the back of the C-shaped channel and projecting inwardly from midway between the two legs of the C-shaped channel, the top of the frame having a T-shape in cross section with the leg of the "T" projecting inwardly toward the center of the frame and joining the divider carried by the sides of the frame whereby the frame is divided into two halves, and guide means formed as part of said partition along the bottom of said frame for guiding said display material into the appropriate pocket on the appropriate side of the frame.*

*20. A frame for holding a plurality of display panels comprising a molded plastic outer frame having an inwardly opening channel on three sides thereof, the fourth side of the frame having a T-shape in cross section with the leg of the "T" projecting inwardly toward the center of the frame, a divider molded integrally with the frame midway between the sides of the channel, said divider joining with said leg of the "T" whereby the frame is divided into two halves, and a guide formed on the divider on the side opposite the fourth side of the frame, said guide comprising end portions extending farther into the open center of the frame than the midportion extends so as to provide a gradually sloping curve from each adjacent side portion so as to guide display panels into the appropriate half on the appropriate side of the divider.*

*21. A frame for holding a plurality of display panels comprising a molded plastic outer frame having an inwardly opening channel on three sides thereof, one of said sides having upwardly and downwardly projecting pivot members being operatively connected to a stand to permit said frame to be rotated about the axes of said pivots, the fourth side of the frame having a T-shape in cross section with the leg of the "T" projecting inwardly toward the center of the frame, a divider molded integrally with the frame midway between the sides of the channel, said divider joining with said leg of the "T" whereby the frame is divided into two halves, and guide means carried by said divider on the side of the divider opposite to said T-shaped side, said guide means being arcuate in shape from end to end with the low part of the arc being at the middle of the guide means.*

*22. A frame for displaying material on opposite sides thereof, said frame having four walls with one wall having upwardly and downwardly projecting pivot members carried thereby, said pivot members being operatively connected to a stand to permit said frame to be rotated about the axes of said pivots, said frame having three of said walls comprised of a molded plastic inwardly open channel member having a C-shape in cross section, a divider molded integrally with the back of the C-shaped channel and projecting inwardly from midway between the two legs of the C-shaped channel, the fourth wall of the frame having a T-shape in cross section with the leg of the "T" projecting inwardly toward the center of the frame and joining said divider whereby the frame is divided into two halves, and guide means carried by said divider on the side of the divider opposite to said T-shaped side, said guide means being arcuate in shape from end to end with the low part of the arc being at the middle of the guide means, whereby a display panel in one half of the frame will first contact the high ends of the arcuate shape and be guided back into said half of the frame.*

* * * * *